United States Patent Office 2,804,368
Patented Aug. 27, 1957

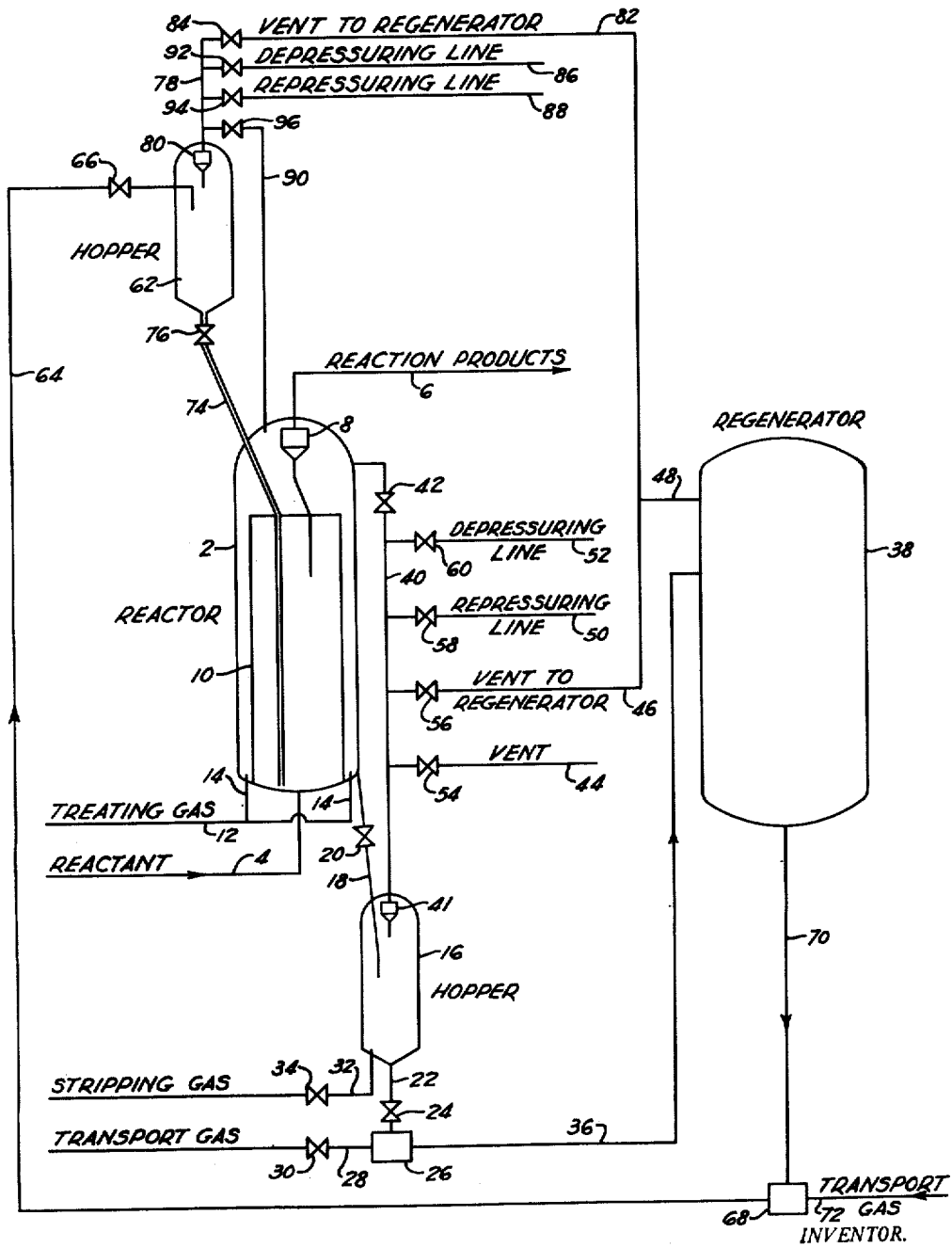

2,804,368

FLUIDIZED BED CATALYST PROCESS AND APPARATUS FOR REACTION OF HYDROCARBONS

Claude R. Summers, Jr., Havertown, Pa., assignor to Gulf Oil Corporation, Pittsburgh, Pa., a corporation of Pennsylvania Application April 25, 1955, Serial No. 503,720

7 Claims. (Cl. 23—1)

This invention relates to improved process and apparatus for carrying out catalytic operations. It relates in particular to process and apparatus in which a continuous elevated pressure process can be carried out in the presence of a fluidized catalyst which requires regeneration at a lower pressure.

Carrying out catalytic operations under elevated pressure in the presence of a fluidized catalyst has given rise to a number of problems. Ordinarily it is necessary to periodically regenerate the catalyst. The most common method of accomplishing this is to terminate the on-stream reaction and regenerate the catalyst at atmospheric pressure either in the reactor or in a separate regenerator. This mode of operation involves depressuring and reactor and therefore is relatively complicated and also costly since it is not possible to use the reactor during all or part of the regenerating period. High pressure reactors are quite expensive and it is desirable to use them continuously.

Attention has been turned to converting such processes to continuous operation. For instance, it has been proposed in U. S. Patent 2,700,015, January 18, 1955, Joyce, "High Pressure Fluid Hydrogenation Process," to continuously add catalyst to the reactor through alternate lock chambers and to continuously remove catalyst through alternate lock chambers, to regenerate the removed catalyst and return it to the reactor through a lock chamber. In this way the reactor is on stream at all times instead of intermittently. However, removal and addition of the catalyst causes the level of the catalyst in the reactor to fluctuate. This results in considerable variation in the properties of the product or necessitates varying the volume of flow of reactants to the reactor. Although variation in volume of the catalyst can be avoided by simultaneous addition and removal, this results in intermixture of regenerated catalyst with catalyst to be regenerated.

This invention has for its object to provide catalytic process and apparatus whereby the foregoing difficulties can be overcome or minimized. Another object is to provide process and appaartus which will make possible continuous catalytic operation at elevated pressure in the presence of a catalyst which requires regeneration. A further object is to provide catalytic process and apparatus in which catalyst is added to and removed from the reactor in a mass of substantial size without fluctuation in the volume or level of catalyst in the reactor. Another object is to provide a process wherein the catalyst particles are used, without replenishment, until deactivated to a substantial extent and are then replaced with fresh catalyst while avoiding intermixture between fresh and used catalyst. Another object is to provide an improved fluidized catalytic process in which catalyst is used until it requires regeneration and is then substantially entirely replaced with fresh catalyst without terminating the on-stream cycle. Other objects will appear hereinafter.

These and other objects are accomplished by my invention which includes passing reactant to be catalytically converted through a dense phase of fluidized catalyst positioned inside a closed reactor at elevated pressure, removing reaction products from the top of the dense phase of catalyst, continuing said passage through the same catalyst particles until said particles have become deactivated to a substantial extent, filling a first closed chamber with regenerated catalyst in an amount which is a substantial fraction of the catalyst in the reactor, rapidly introducing the catalyst in the first closed chamber into the body of dense phase of catalyst in the reactor to thereby displace used dense phase catalyst with regenerated catalyst and to cause the used and displaced catalyst to overflow into a withdrawal space adjacent to the body of dense phase of catalyst, which withdrawal space is positioned within the reactor and is exposed to the elevated pressure therein, maintaining the displaced catalyst in the withdrawal space separate from the other catalyst in the reactor, withdrawing the displaced catalyst from the withdrawal space into a second closed chamber, which second chamber is at elevated pressure, removing the catalyst from the second closed chamber, regenerating this removed catalyst at a substantially lower pressure and introducing the regenerated catalyst into the first closed chamber, all of said operations being carried out while continuing passage of reactant through the dense phase of catalyst in the reactor.

My invention also includes a vertical reactor adapted to operate under elevated pressure and adapted to retain a body of fluidized catalyst therein in a dense and light phase. A substantially vertical partition is provided in the reactor separating the lower inside portion of the reactor into separate compartments communicating with each other at the top of the partition. One of these compartments serves as a reacting section and the other compartment serves as a catalyst withdrawal section. The top of the partition corresponds approximately to the top of the dense phase of catalyst which is in the reactor during operation. Introduction and withdrawing locks having a weight capacity equal to or substantially equal to the catalyst capacity of the reactor are provided. The introduction lock is supplied with catalyst from a refenerator and is designed to permit rapid introduction of catalyst into the reacting compartment. The withdrawal lock is connected to the withdrawing compartment of the reactor and serves to remove catalyst therefrom and deliver it to the regenerator.

In the following examples and descriptions I have set forth several of the preferred embodiments of my invention but it is to be understood that they are given for the purpose of illustration and not in limitation thereof.

Referring to the accompanying drawing, numeral 2 designates a vertical reactor provided with a conduit 4 at the base for introducing reactant and with a conduit 6 at the top for removing reaction products. Withdrawal conduit 6 is connected to a cyclone separator 8 which serves to remove catalyst particles from the effluent. Numeral 10 designates a cylindrical insert positioned concentrically with and inside of reactor 2 so as to form an annular space therebetween. Numeral 12 designates a conduit delivering treating gases or vapor to a plurality of conduits 14 which communicate with this annular space.

Numeral 16 designates a hopper which is positioned at a lower level than reactor 2. Numeral 18 indicates a conduit connecting the inside of hopper 16 with the annular space between reactor 2 and cylinder 10. Conduit 18 is provided with a valve 20. The base of hopper 16 connects to a conduit 22 provided with valve 24 which conduit connects to a jet or entraining chamber 26 to which a transport gas is supplied through conduit 28 at a rate controlled by valve 30. Numeral 32 designates another conduit connected to the lower portion of hopper 16 which conduit is provided with a valve 34. Numeral 36 indicates a conduit connecting jet 26 to regenerator 38 which is at a lower pressure than reactor 2 and preferably at atmospheric pressure.

The upper portion of hopper 16 is provided with a conduit 40 which has a cyclone separator 41 at its lower end and which connects to the upper part of reactor 2 through valve 42. Conduit 40 also is connected to line 44 serving as a vent; to line 46, connecting to regenerator 38 by way of conduit 48; to line 50 serving as a repressuring line; and to line 52 serving as a depressuring line. Lines 44, 46, 50 and 52 are provided respectively with valves 54, 56, 58 and 60.

Numeral 62 indicates a hopper which is positioned above the level of the dense phase of catalyst in reactor 2. This hopper is adapted to hold catalyst in an amount which is a substantial fraction of that retained, during operation, in reactor cylinder 10. Numeral 64 designates a conduit connecting the upper portion of hopper 62 through control valve 66 to jet or entraining chamber 68 which receives regenerated catalyst from regenerator 38 through conduit 70. Transport gas is supplied to jet 68 through conduit 72.

The lower portion of hopper 62 is provided with a conduit 74 and control valve 76 which serves to deliver catalyst from the hopper into the inside of cylinder 10. This conduit and control valve should be of wide aperture to permit rapid flow of catalyst from hopper 62 into cylinder 10. Numeral 78 designates a conduit connected to the top of hopper 62 which conduit is provided with a cyclone separator 80 at its lower end. Conduit 78 is connected to regenerator 38 through conduits 82 and 48 and valve 84. Conduit 78 is also connected to depressuring line 86, repressuring line 88 and pressure equalizing line 90. Line 90 is also connected to the upper part of reactor 2. Lines 86, 88 and 90 are respectively controlled by valves 92, 94 and 96.

In describing the operation of the apparatus illustrated in the drawing it will be assumed that reactor 2 contains a charge of fluidized catalyst and that hopper 62 is empty and ready to receive a charge of catalyst from the regenerator and that the annular space between reactor 2 and cylinder 10 is filled with catalyst to be regenerated. It is also assumed that hopper 16 is empty but has been repressured. The operation will be described as being a catalytic hydrodesulfurization of a hydrocarbon at a pressure of about 1000 p. s. i. g. in the presence of hydrogen utilizing a fluidized hydrogenating catalyst, such as nickel tungstate, deposited upon a porous carrier, such as a silica-alumina cracking catalyst.

The hydrocarbon vapors to be desulfurized and hydrogen are introduced through conduit 4 at a rate such as to maintain a dense and light phase of the catalyst in reactor 2, the catalyst being at a temperature of about 850° F. The dense phase should preferably be at about the top of cylinder 10 and it will automatically stay at this position during the course of the catalytic operations. The space between cylinder 10 and reactor 2 will be occupied by catalyst which is to be regenerated. A gas, such as hydrogen, at elevated temperature, for instance 1000° F., is introduced through conduits 12 and 14 to hydrogenate from the catalyst the tars and hydrocarbons deposited on the catalyst and convert them into useful products which pass upwardly into cyclone separator 8 along with the desulfurized vapors which have passed through the main portion of the fluidized dense phase in cylinder 10. Cyclone 8 separates the entrained catalyst particles and returns them to the reactor, and the reaction products and hydrogen pass from the reactor through conduit 6. These operations continue with the same catalyst particles until they have become deactivated to a substantial extent.

After the catalyst in the annular space between cylinder 10 and reactor 2 has been sufficiently treated with hydrogen, valve 20 is opened (valve 42 is already opened so that hopper 16 is at reactor pressure). The catalyst in the annular space flows through conduit 18 into hopper 16. The volume of catalyst held in this annular space preferably corresponds approximately with the volume of catalyst held by hopper 16. When hopper 16 is filled to the desired extent valves 20 and 42 are closed and valve 60 is opened slightly to permit gradual depressuring. Flow of catalyst through line 40 is prevented by cyclone 41. Relatively slow depressuring in order to avoid undue strain on the catalyst and entrainment of catalyst in the gas is desirable.

When hopper 16 has been depressured, valve 60 is closed and valves 34 and 54 are opened. Stripping gas such as steam is then introduced through conduit 32 to remove residual hydrocarbon and hydrogen from the catalyst in hopper 16. This stripping gas may be vented through a stack or recovered as desired. Valves 34 and 54 are then closed and valves 56, 24 and 30 are opened and transport gas is introduced through conduit 28. The catalyst flows from hopper 16 into jet 26 and is transported by the transport gas through conduit 36 into regenerator 38. The purpose of line 46 is to equalize the pressure in hopper 16 with the pressure in the regenerator. Hopper 16 is then returned to refilling status by closing valves 56, 24 and 30 and opening valve 58 to repressure the hopper. Valve 58 then is closed and valve 42 is opened to equalize the pressure.

In the regenerator the catalyst is treated to remove the carbonaceous deposit and to return the catalyst to substantially its original activity. This can be accomplished in any conventional manner, such as by burning the carbonaceous deposit with a mixture of air and steam. The volume of catalyst in regenerator 38 preferably is such as to maintain a continuous combustion.

While the above described operations are taking place, hopper 62 will be filling with regenerated catalyst which is to be introduced into reactor 2. Thus regenerated catalyst is removed from the regenerator through line 70 and is transported into hopper 62 by transport gas introduced into jet 68, through conduit 72. During this transfer, valve 84 is opened to equalize the pressure in hopper 62 with the pressure in regenerator 38. When hopper 62 has been filled to the desired extent, valves 66 and 84 are closed. The contents of hopper 62 then are ready to be introduced into reactor 10. This introduction takes place when the catalyst in the reactor has become deactivated to an extent such as to require increase in the activity by complete replacement or by substitution of a substantial fraction, i. e. above about 50 percent of regenerated catalyst. It is preferred that this introduction of fresh catalyst take place after filling of hopper 16 has been completed. Emptying of hopper 62 is accomplished by introducing repressuring gas by opening valve 94. Valves 96 and 76 are of course still in closed position. When hopper 62 reaches the pressure of reactor 2, valve 94 is closed and valve 96 is opened to equalize the pressure in hopper 62 with that in reactor 2. Valve 76 then is opened and the catalyst contained in hopper 62 rapidly flows through conduit 74 into cylinder 10. This displaces catalyst in cylinder 10 so that it overflows the top of cylinder 10, which acts as a weir, and then flows into the annular space between cylinder 10 and reactor 2. This overflow catalyst then is treated with hydrogen and removed to hopper 16 as previously described. Hopper 62 then is returned to refilling status. This is accomplished by closing valves 76 and 96 and opening valve 92 to depressure hopper 62. When depressuring is accomplished, valve 92 is closed. Refilling of hopper 62 is initiated by opening valves 66 and 84. If the catalyst flowing into hopper 62 is above reaction temperature, it can be cooled in any desired manner as by heat exchange or injection of a coolant.

Rapid flow of regenerated catalyst into reactor 10 is desirable so that displacement of used catalyst will take place with a minimum amount of intermixing between fresh and used catalyst. While charge stock is being passed through the used catalyst simultaneously with the displacement of used catalyst by the fresh catalyst, this will cause only a moderate amount of intermixture if the addition of displacing catalyst is rapid.

In actual practice it would be advisable to so position hopper 16 and especially hopper 62 so that conduit 22 and especially conduit 74 would be substantially vertical. The catalyst in these hoppers is in a settled condition and such positioning would improve the rapid flow of the catalyst. The catalyst weight capacity of hoppers 16 and 62 and the annular space between reactor 2 and cylinder 10 should preferably equal that of cylinder 10. If the catalyst holding capacity of hopper 62 is larger than that of cylinder 10, part of the added catalyst will spill over into the annular space and full utilization of the fresh catalyst will not take place. The catalyst capacity of the annular space between walls 2 and 10 can with advantage be slightly larger than that of hopper 62.

It is evident from the foregoing description that the reaction in reactor 2 is of the nature of a fixed fluidized bed catalytic operation, yet the reaction takes place continuously during the catalyst introduction and removal operations as well as during the regular on-stream period. Furthermore, the introduction and removal of catalyst does not affect the level or amount of catalyst present for the catalytic reaction and intermixture of fresh and used catalyst is minimized. The actual volume of catalyst engaged in the reaction is constant and corresponds to the volume of cylinder 10. The catalyst in the concentric portion between cylinder 10 and reactor 2 fluctuates, but since this is not involved in the reaction, this has no effect on the course of the reaction. In order to have continuous regeneration under optimum conditions, it is advantageous to have one regenerator serve a plurality of reactors.

The reactor may be divided into withdrawal and reacting sections of any desired shape so long as they are arranged so that catalyst filling into the reacting section causes excess catalyst to flow by gravity into the withdrawal section. For instance, the withdrawal section could occupy the central portion of the reactor while the reacting section could occupy the outside annular area. The sections need not be circular in cross section nor need they be concentric. However, circular, concentric sections are advantageous. All of the valves can be automatically operated in the sequence described if they are time cycle valves. It is undesirable to have valves closing on solid catalyst since the valve seats will be abraded. The only valve which might close on solid catalyst is valve 20. This can be avoided by introducing a blast of gas to sweep the valve seat just before it closes. See U. S. Patent 2,662,338, December 29, 1953, "Line and Valve System for Fluidized Particle Handling," Cornell. Arranging hopper 62 so that its base is above the dense phase in the reactor and hopper 16 so that the catalyst level therein is below the lowest part of the withdrawal space in the reactor helps keep the valves free of catalyst. The valves are preferably positioned in the line so that they are above the catalyst levels after emptying is completed.

I have found it convenient to describe my invention in connection with a catalytic hydrodesulfurization process. However, it can be used for any catalytic operation which is to be carried out at elevated pressure, i. e. about 100 to 3000 p. s. i. g. in the presence of a fluidized catalyst in which the catalyst is used until substantially reduced in activity and then regenerated at a lower pressure in another vessel. Other processes in which my invention can be used are hydroreforming of hydrocarbons, the synthesis of hydrocarbons from carbon monoxide and hydrogen, destructive hydrogenation of hydrocarbons, and the oxidation of hydrocarbons to form synthetic chemicals, for instance, the oxidation of naphthalene to phthalic acid. The invention is of particular value in connection with processes which require treatment of the catalyst prior to regeneration. This can be accomplished in the withdrawal section at the same temperature or different temperature than that at which the reacting section of the reactor is operating.

This application is a continuation-in-part of application Serial No. 228,717, filed May 28, 1951, which became abandoned subsequent to the filing of the present application.

I claim:

1. A catalytic process comprising passing reactant to be catalytically converted through a dense phase of fluidized catalyst positioned inside a closed reactor at elevated pressure, removing reaction products from the top of the dense phase of catalyst, continuing said passage through the same catalyst particles until said particles have become substantially reduced in activity, filling a first closed chamber with regenerated catalyst in an amount which is a substantial fraction of the catalyst in the reactor, rapidly introducing the catalyst in the first closed chamber into the body of dense phase of catalyst in the reactor to thereby displace used dense phase catalyst with regenerated catalyst and to cause the used and displaced catalyst to overflow into a withdrawal space adjacent to the body of dense phase of catalyst, which withdrawal space is positioned within the reactor and is exposed to the elevated pressure therein, maintaining the displaced catalyst in the withdrawal space separate from the introduced regenerated catalyst, withdrawing the displaced catalyst from the withdrawal space into a second closed chamber, which second chamber is at elevated pressure, removing the catalyst from the second closed chamber, regenerating this removed catalyst at a substantially lower pressure and introducing regenerated catalyst into the first closed chamber, all of said operations being carried out while continuing passage of reactant through the dense phase of catalyst in the reactor.

2. A catalytic process comprising passing reactant to be catalytically converted through a dense phase of fluidized catalyst positioned inside a closed reactor at elevated pressure, removing reaction products from the top of the dense phase of catalyst, continuing said passage through the same catalyst particles until said particles have become substantially reduced in activity, filling a first closed chamber with regenerated catalyst in an amount which is at least 50 percent of the catalyst in the reactor, introducing a gas under pressure into the first closed chamber, rapidly introducing the catalyst in the first closed chamber into the body of dense phase of catalyst in the reactor to thereby displace used dense phase catalyst with regenerated catalyst and to cause the used and displaced catalyst to overflow into a withdrawal space adjacent to the body of dense phase of catalyst, which withdrawal space is positioned within the reactor and is exposed to the elevated pressure therein, maintaining the displaced catalyst in the withdrawal space separate from the introduced regenerated catalyst, withdrawing the displaced catalyst from the withdrawal space into a second closed chamber, which second chamber is at elevated pressure, depressuring the second closed chamber, removing the catalyst from the second closed chamber, regenerating this removed catalyst at a substantially lower pressure and introducing regenerated catalyst into the first closed chamber, all of said operations being carried out while continuing passage of reactant through the dense phase of catalyst in the reactor.

3. A catalytic process comprising passing reactant to be catalytically converted through a dense phase of a fluidized catalyst positioned inside a closed reactor at elevated pressure, removing reaction products from the top of the dense phase of catalyst, continuing said passage through the same catalyst particles until said particles have become substantially reduced in activity, filling a first closed chamber with regenerated catalyst in an amount which is substantially equal to the catalyst in the reactor, introducing a gas under pressure into the first closed chamber, rapidly introducing the catalyst in the first closed chamber into the body of dense phase of catalyst in the reactor to thereby displace used dense phase catalyst with regenerated catalyst and to cause the used and displaced catalyst to overflow into a withdrawal space adjacent to the body of dense phase of catalyst, which withdrawal space is positioned within the reactor and is exposed to the elevated pressure therein, maintaining the displaced catalyst in the withdrawal space separte from the introduced regenerated catalyst, withdrawing the displaced catalyst from the withdrawal space into a second closed chamber, which second chamber is at elevated pressure, depressuring the second closed chamber, removing the catalyst from the second closed chamber, regenerating this removed catalyst at a substantially lower pressure and introducing regenerated catalyst into the first closed chamber, all of said operations being carried out while continuing passage of reactant through the dense phase of catalyst in the reactor.

4. A catalytic process comprising passing reactant to be catalytically converted through a dense phase of fluidized catalyst positioned inside a closed reactor at elevated pressure, removing reaction products from the top of the dense phase of catalyst, continuing said passage through the same catalyst particles until said particles have become substantially reduced in activity, filling a first closed chamber with regenerated catalyst in an amount which is substantially equal to the catalyst in the reactor, introducing a gas under pressure into the first closed chamber, rapidly introducing the catalyst in the first closed chamber into the bottom portion of the dense phase of catalyst in the reactor to thereby displace used dense phase catalyst with regenerated catalyst and to cause the used and displaced catalyst to overflow into a withdrawal space adjacent to the body of dense phase of catalyst, which withdrawal space is positioned within the reactor and is exposed to the elevated pressure therein, maintaining the displaced catalyst in the withdrawal space separate from the introduced regenerated catalyst, withdrawing the displaced catalyst from the withdrawal space into a second closed chamber, which second chamber is at elevated pressure, depressuring the second closed chamber, removing the catalyst from the second closed chamber, regenerating this removed catalyst at a substantially lower pressure and introducing regenerated catalyst into the first closed chamber, all of said operations being carried out while continuing passage of reactant through the dense phase of catalyst in the reactor.

5. A catalytic process comprising passing reactant to be catalytically converted through a dense phase of fluidized catalyst positioned inside a closed reactor at elevated pressure, removing reaction products from the top of the dense phase of catalyst, continuing said passage through the same catalyst particles until said particles have become substantially deactivated, removing used catalyst from the reactor and introducing regenerated catalyst into the reactor characterized by filling a first closed chamber with regenerated catalyst in an amount which is equal to the catalyst in the reactor, introducing a gas under pressure into the first closed chamber, rapidly introducing the catalyst in the first closed chamber into the lower portion of the body of dense phase of catalyst in the reactor to thereby displace used dense phase catalyst with regenerated catalyst andto cause the used and displaced catalyst to overflow into a withdrawal space adjacent to the body of dense phase of catalyst, which withdrawal space is positioned within the reactor and is exposed to the elevated pressure therein, maintaining the displaced catalyst in the withdrawal space separate from the introduced regenerated catalyst, introducing a stripping gas into approximately the bottom of the withdrawal space, withdrawing the displaced catalyst from the withdrawal space into a second closed chamber, which second chamber is at elevated pressure, depressuring the second closed chamber, removing the catalyst from the second closed chamber, regenerating this removed catalyst at substantially atmospheric pressure and introducing the regenerated catalyst into the first closed chamber, all of said operations being carried out while continuing passage of reactant through the dense phase of catalyst in the reactor.

6. Catalytic apparatus for carrying out a fixed bed catalytic operation under elevated pressure wherein fresh catalyst is intermittently introduced into and used catalyst is intermittently removed from the catalytic apparatus and wherein substantial intermixture between introduced and removed catalyst and substantial variation in the catalyst level during such addition and removal is avoided, which apparatus comprises in combination a substantially vertical cylindrical reactor casing, a substantially vertical cylindrical partition positioned in the lower portion of the reactor casing and concentric therewith, thereby separating the lower inside portion of the reactor casing into separate compartments communicating with each other at the top of the cylindrical partition, the central compartment serving as a reacting section and the outer compartment as a catalyst withdrawal section, the top of said partition approximately corresponding to the top of the dense phase of catalyst which, during operation is present in the central compartment, a first closed hopper adapted to hold catalyst in an amount about equal to that held during operation in the reactor casing, a valved conduit connecting the lower part of the outer compartment with the first closed hopper, means for pressuring the first hopper, an outlet for the first hopper, a control valve for the outlet to the first hopper, a regenerator adapted to regenerate at a substantially lower pressure than exists, during operation, in the reactor, means for conveying solid particles from the outlet of the first hopper to the regenerator, a second hopper adapted to hold catalyst in an amount about equal to that held in the reactor casing during operation, an inlet to the second hopper, a valve for controlling the inlet to the second hopper, means for withdrawing regenerated catalyst from the regenerator, means for introducing withdrawn and regenerated catalyst into the second hopper, means for pressuring the second hopper, a valved conduit of wide aperture connecting the second hopper to the lower portion of the central compartment, means for introducing reactant into the lower part of the central compartment and means for removing reaction product from the upper part of the reactor casing.

7. Catalytic apparatus for carrying out a fixed bed catalytic operation under elevated pressure wherein fresh catalyst is intermittently introduced into and used catalyst is intermittently removed from the catalytic apparatus and wherein substantial intermixture between introduced and removed catalyst and substantial variation in the catalyst level during such addition and removal is avoided, which apparatus comprises in combination a substantially vertical cylindrical reactor casing, a substantially vertical cylindrical partition positioned in the lower portion of the reactor casing concentric therewith and dividing the lower inside portion of the reactor casing into separate approximately equal compartments communicating with each other at the top of the cylindrical partition, the central compartment serving as a reacting section and the outer compartment as a catalyst withdrawal section, the top of said partition approximately corresponding to the top of the dense phase of catalyst which, during operation, is present in the central compartment, a first closed hopper adapted to hold catalyst in an amount about equal to that held in the reactor casing during operation, a valved conduit connecting the lower part of the outer compartment with the first closed hopper, means for pressuring the first hopper, an outlet for the first hopper, a control valve for the outlet to the first hopper, a regenerator adapted to regenerate at a substantially lower pressure than exists, during operation, in the reactor, means for conveying solid particles from the outlet of the first hopper to the regenerator, a second hopper adapted to hold catalyst in an amount about equal to that held in the reactor casing during operation, an inlet to the second hopper, a valve for controlling the inlet to the second hopper, means for withdrawing regenerated catalyst from the regenerator, means for introducing withdrawn and regenerated catalyst into the second hopper, means for pressuring the second hopper, a valved conduit of wide aperture connecting the second hopper to the lower portion of the central compartment, means for introducing reactant into the lower part of the central compartment and means for removing reaction product from the upper part of the reactor casing.

References Cited in the file of this patent

UNITED STATES PATENTS

| | | |
|---|---|---|
| 2,488,029 | Scheineman | Nov. 15, 1949 |
| 2,664,339 | Cornell | Dec. 29, 1953 |
| 2,700,015 | Joyce | Jan. 18, 1955 |

UNITED STATES PATENT OFFICE

CERTIFICATE OF CORRECTION

Patent No. 2,804,368                                                    August 27, 1957

Claude R. Summers, Jr.

It is hereby certified that error appears in the printed specification of the above numbered patent requiring correction and that the said Letters Patent should read as corrected below.

Column 1, line 28, after "depressuring and" insert "repressuring of the"; column 2, lines 42 and 43, for "refenerator" read -- regenerator --; column 7, line 12, for "separte" read -- separate --; line 66, for "andto" read -- and to --.

Signed and sealed this 15th day of October 1957.

(SEAL)
Attest:
KARL H. AXLINE
Attesting Officer

ROBERT C. WATSON
Commissioner of Patents